Aug. 21, 1956  V. LECOURT  2,759,282
DISPLAY DISC ATTACHMENT DEVICE
Filed Jan. 29, 1953
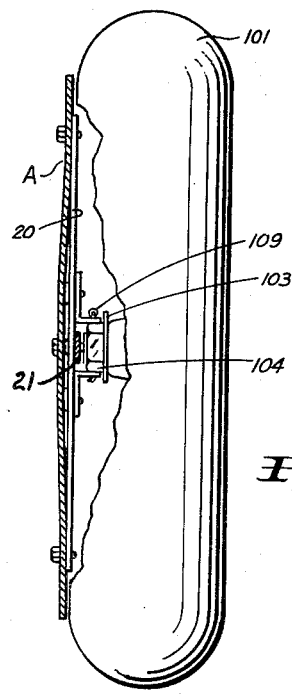
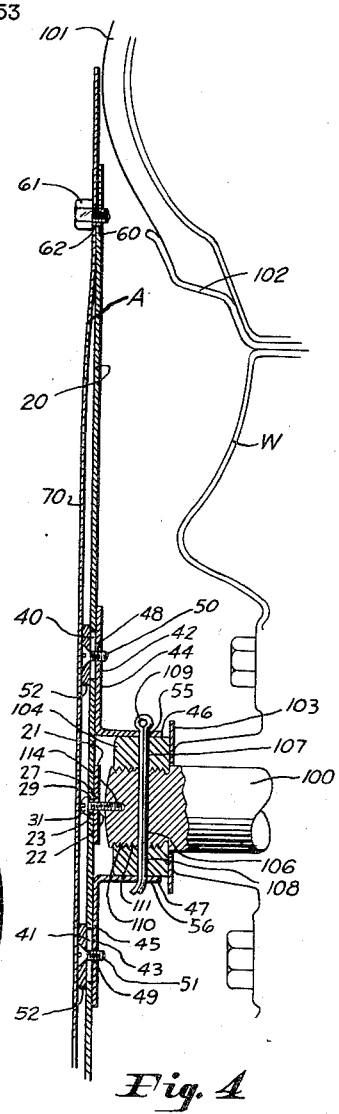
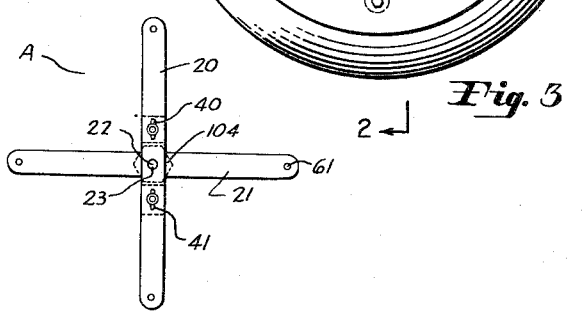
Fig. 1  Fig. 2  Fig. 3  Fig. 4
INVENTOR.
Valere Lecourt
BY Pearson & Pearson
ATTORNEYS

# United States Patent Office 2,759,282
Patented Aug. 21, 1956

2,759,282

DISPLAY DISC ATTACHMENT DEVICE

Valere Lecourt, Dracut, Mass.

Application January 29, 1953, Serial No. 334,023

2 Claims. (Cl. 40—129)

This invention relates to nonrotating display devices for attachment to the wheels of automotive vehicles.

Heretofore such devices have been used and have usually been in the form of a circular disc having a diameter nearly as great as the diameter of the pneumatic tire on the vehicle. Printed matter, such as advertising, is placed on the outside surface of the disc and since the disc hides the rotating wheel, an attention-attracting illusion is created. Prior devices have usually been either supported on some nonrotating part of the vehicle wheel such as the axle or axle nut, or have been supported on a rotating part of the wheel by a comparatively frictionless connection and weighted to prevent rotation. However the various changing types of axle and wheel structure and the many variations from year to year in dimensions thereof have made it necessary to make a multiplicity of sizes of display disc supports and to continually change the dimensions thereof.

The principal object of this invention is, therefore, to provide a support for a display disc which can be adjusted to fit a large percentage of the vehicles now in operation.

Another object of the invention is to provide such a support in a form which can be shipped and sold in a compact package.

Still another object of the invention is to provide an adjustable support for a display disc which can be easily assembled and installed without complicated tools by the ordinary vehicle driver.

A still further object of the invention is to provide a support for a display disc which is inexpensive to manufacture and yet sturdy enough to withstand the shocks of vehicle travel.

In the drawing:

Fig. 1 is a side elevation of the preferred form of the invention before the disc is attached.

Fig. 2 is a front elevation of the invention, in section on line 2—2 of Fig. 3.

Fig. 3 is a view similar to Fig. 1 with the display disc attached and a modified form of cross brace connection, and Fig. 4 is an enlarged fragmentary view, similar to Fig. 2, showing in detail the preferred form of the invention.

As shown in the drawing, A is the nonrotating display device of the invention used in conjunction with a wheel W, mounted to rotate on an axle 100 in a well known manner.

Wheel W is provided with a pneumatic tire 101, a tire rim 102, a grease washer 103 and a polygonal axle nut 104, the nut 104 usually being of the hexagonal type. A hole 106, through the axle 100, and holes such as 107, 108 through the axle nut 104 are provided to receive a cotter pin 109 arranged to prevent the threads 110 on the axle nut from becoming detached from the exterior threads 111 of the axle 100. An interiorly threaded recess 114 is provided at the end of axles such as 100, the recess extending along the end of the longitudinal axis of the axle.

The nonrotating display device A includes an elongated, substantially-vertical brace 20 of rigid material such as a strip of steel or the like and an elongated substantially horizontal brace 21 also of such rigid material. The pair of braces 20 and 21 cross each other at right angles and brace 21 is detachably fixed at its centre 22 to the centre 23 of brace 20. As indicated in Fig. 3 a pair of holes 225, 226 may be provided in brace 221 which register with a pair of holes 227, 228 in brace 220 and suitable threaded connecting elements 230, 231 may be passed through the holes to rigidly connect the braces in the form of a cross.

In the preferred form of the invention shown in Figs. 1, 2 and 4, a single hole 27 in brace 21, registers with a single hole 29 in brace 20 and a threaded bolt 31 is passed therethrough and engaged in the interiorly threaded recess 114 of axle 100.

The attaching means of the device includes a pair of aligned, substantially vertical slots 40 and 41 spaced on opposite sides of the centre 23 of brace 20 at equal distances therefrom. A pair of brackets 42 and 43 are provided, each preferably of L shape, and each having a longer leg 44, 45 adapted to engage flatwise the brace 20 and each having a shorter leg 46, 47 extending inwardly and adapted to engage flatwise on one of the faces of the polygonal axle nut 104. Legs 44, 45 are each provided with a threaded hole 48 or 49 for a set screw 50 or 51 slidably mounted in slots 40 or 41. Washers such as 52 may also be used if desired. Legs 46 and 47 are each provided with a cotter pin hole 55 and 56 arranged to receive the cotter pin 109.

At the opposite terminal ends of braces such as 20, 21. Threaded holes such as 60 are provided for bolts such as 61 which pass through holes such as 62 in the display disc 70. The display disc 70 is thus mounted on the outer sides of braces 20 and 21 with its periphery close to the tread of tire 101 and covering the entire wheel axle and rim.

Advertisements may be placed on the outside surface of the disc 70 and will not rotate while wheel W is rotating and the illusion that the vehicle is moving with a non revolving wheel is secured.

The display disc 70 is usually prepared by an advertising firm and is not usually sold with the supporting device. The supporting device can therefore be shipped in a long narrow box with the braces 20 and 21 parallel to each other and the brackets and bolts in the same container. In erecting the device, the vehicle hub cap is first removed and then the cotter pin 109. Unlike certain prior devices, it is not necessary to remove the grease washer 103. The braces 20 and 21 are then placed in the form of a cross, and the bolt 31 passed through holes 27 and 28 and threaded into the axle recess 114. This operation centres the braces, whereupon brackets 42 and 43, slidably supported in slots 40 or 41 by the loose set screws 50 or 51 are positioned with the legs 46 and 47 flatwise on an opposite polygonal face of axle nut 104 with the cotter pin holes 55 and 56 in registration with cotter pin holes 107 and 108. A cotter pin such as 109 is then passed through holes 55, 56, 107, 108 and 100 and turned over in the usual manner to secure legs 46 and 47 of the brackets on the axle nut. The legs 44 and 45 are then tightened in place by set screws 50 and 51 and the display disc 70 is attached to the braces 20 and 21 by the bolts 61 in threaded holes such as 60.

I claim:

1. In a nonrotating display device for use with a rotating vehicle wheel, said wheel having an exteriorly threaded axle, a polygonal axle nut threaded on said axle and a cotter pin passing through said nut and axle, the combination of a first elongated, continuous straight brace of rigid material; a second elongated, continuous, straight brace of rigid material detachably fixed at its centre to the centre of said first brace to form a cross therewith; a pair of longitudinally extending, aligned slots in one of said braces, said slots being each spaced on an opposite side of the centre of said brace; a pair of brackets, each having a leg slideably mounted on said brace by a set screw slideable in one of said slots and each having an inwardly extending leg in flatwise contact with an opposite outer wall of said polygonal axle nut, said inwardly projecting legs each having a cotter pin hole therethrough arranged to receive the axle nut cotter pin and a display disc removably attached around its periphery to the outer faces of the terminal ends of said crossed braces.

2. In a nonrotating display device for use with a rotating vehicle wheel, said wheel having an axle with a central threaded recess, a hexagonal axle nut threaded on said axle and a cotter pin passing through said nut and axle, the combination of a pair of crossed braces of rigid material for supporting a display disc; a display disc detachably connected to the outside of said braces; a central opening in each brace at its centre; a bolt passing through the central opening in each brace and threaded in the central threaded recess of said axle; a pair of aligned longitudinally extending slots, each on an opposite side of the centre of one of said crossed braces; a pair of brackets each having a longitudinally extending leg engaged flatwise against said slotted brace and an inwardly extending leg adapted to rest on a face of said hexagonal nut, said inwardly extending legs each having a cotter pin hole for receiving said cotter pin, and a set screw in each slot threadedly engaged in the adjacent bracket leg for slidably positioning a bracket at various distances from the centre of the brace.

References Cited in the file of this patent

UNITED STATES PATENTS

| | | |
|---|---|---|
| 1,238,749 | Diffenbaugh | Sept. 4, 1917 |
| 1,590,189 | Hamilton | June 29, 1926 |
| 2,292,999 | Heren | Aug. 11, 1942 |